Nov. 14, 1944.   E. W. MILLER   2,362,764
CAM OPERATED CROWNING ATTACHMENT FOR GEAR FINISHING MACHINES
Filed Oct. 10, 1941   2 Sheets-Sheet 1
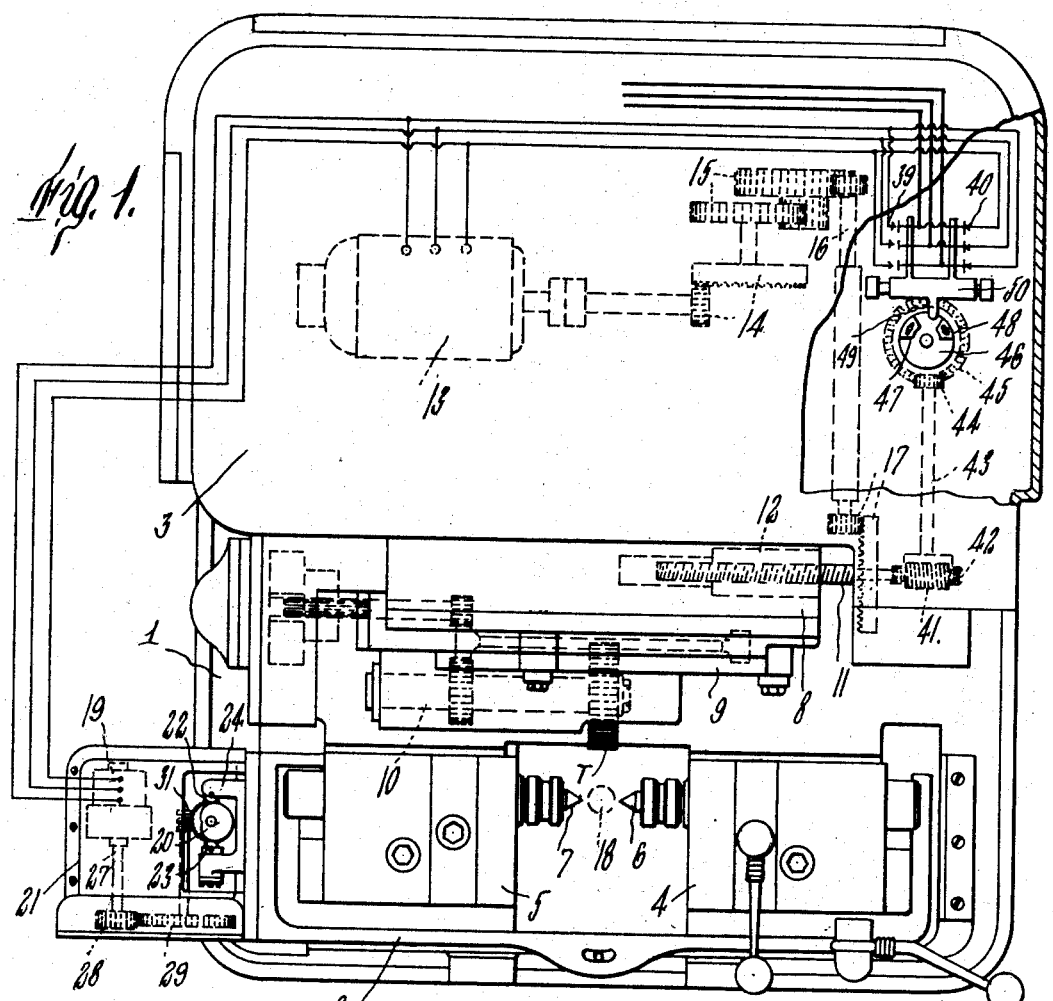
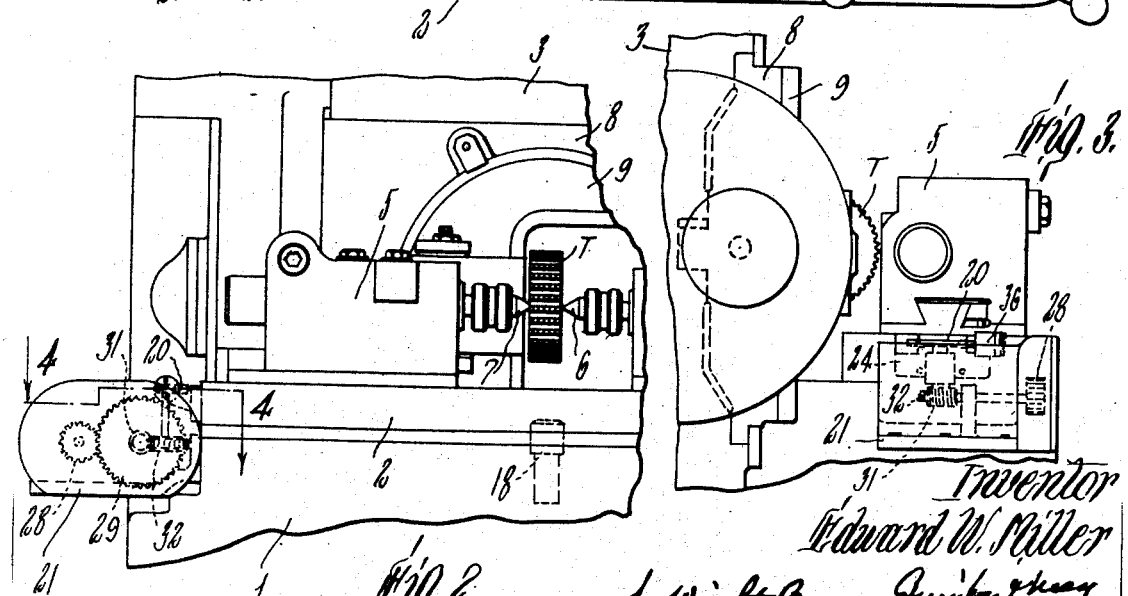
Inventor
Edward W. Miller Nov. 14, 1944.  E. W. MILLER  2,362,704
CAM OPERATED CROWNING ATTACHMENT FOR GEAR FINISHING MACHINES
Filed Oct. 10, 1941   2 Sheets-Sheet 2

Inventor
Edward W. Miller
by Wright, Brown, Quinby & Uray
Attys.

Patented Nov. 14, 1944

2,362,764

UNITED STATES PATENT OFFICE 2,362,764

CAM OPERATED CROWNING ATTACHMENT FOR GEAR FINISHING MACHINES

Edward W. Miller, Springfield, Vt., assignor to The Fellows Gear Shaper Company, Springfield, Vt., a corporation of Vermont Application October 10, 1941, Serial No. 414,465

11 Claims. (Cl. 90—1.6)

This invention is concerned with means for crowning gears while performing a finishing operation upon them so that, when the operation is completed, the gear teeth will not only have the desired approach to absolute accuracy of form and dimensions, but also their side faces will be crowned with a greater or less convexity in the direction of their length. Machines of the type referred to are those which employ a tool in the form of a master gear conjugate to the gears to be finished and, according to the character of the tool employed, are adapted to perform shaving, lapping or burnishing actions on the work gear. The tool and work gear are rotated about their respective axes in mesh with one another and a relative back and forth reciprocation is produced in the direction of the axis of the work. Crowning is produced by tilting the work gear so that its axis is inclined to the path of such relative reciprocation and the degree of inclination is altered in the course of the reciprocating movement in each direction.

In my patent application Serial No. 266,854, filed April 8, 1939, I have shown a gear finishing machine of the type referred to wherein the tool is a shaving cutter, i. e., a gear shaped tool having a multiplicity of cutting or scraping edges in the sides of its teeth, and is movable back and forth in a straight path, and the work is supported by a pivotally mounted table which is swung about its pivot in time with the reciprocations of the tool. The present invention is shown herein as applied to a machine of that type, for illustration and without intent or implication of limiting its use to such a machine exclusively.

The new features of the present invention comprise the use of a cam for causing and changing the inclination between the axis of the work gear and the path of relative reciprocation, which cam is interchangeable with others of different outlines; and the combination of such cam with variable-speed transmission mechanism whereby movement is imparted to the cam in desired timing and speed ratio with the relative movement of reciprocation between tool and work. It further comprises cam follower means of improved design which are self adjusting to a wide range of different cams having various outlines and some differences of radial dimensions. These new features have for their objects to make the machine of unusually wide usefulness for crowning many different gears of widely varying characteristics; and to enable the total range of different kinds of work to be performed with the use of a relatively very small number of cams.

In the drawings which illustrate one embodiment of the invention—

Fig. 1 is a plan view, partly diagrammatic, of a gear finishing machine containing the cam operated crowning means of the present invention;

Fig. 2 is a partial front elevation of the machine showing particularly the cooperation of the work table and the cam and associated propelling means by which the table is swung about its pivot;

Fig. 3 is an end view of the portion of the machine shown in Fig. 2 as viewed from the left of Fig. 2;

Figure 4:
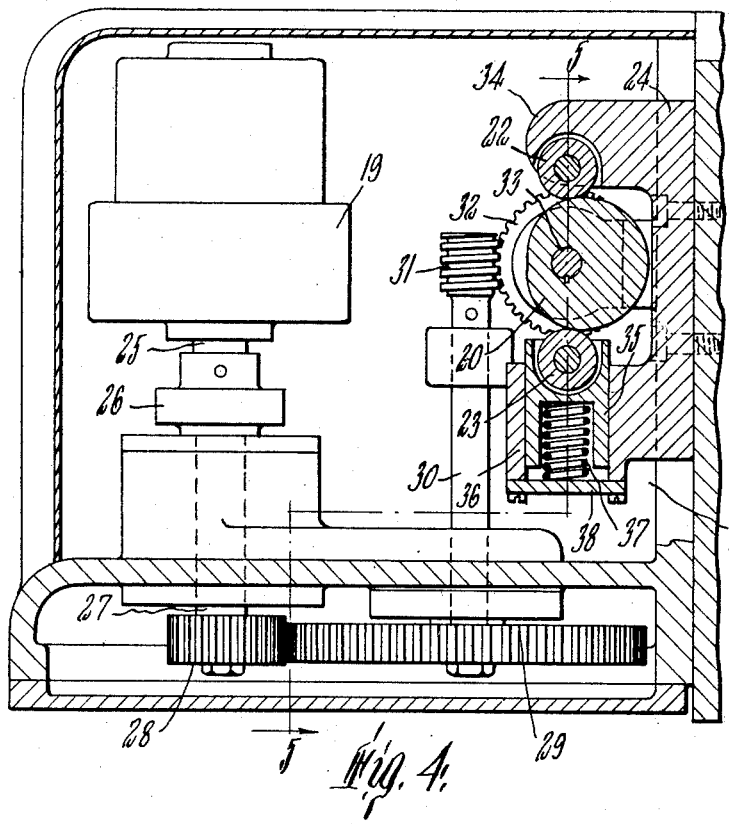
Fig. 4 is a horizontal sectional view of the crowning means taken on line 4—4 of Fig. 2 and shown on a larger scale.
Figure 6:
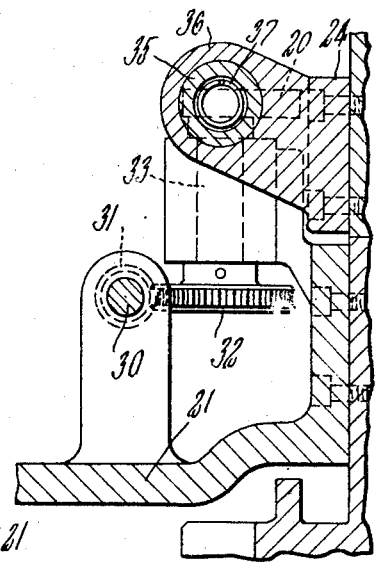
Figure 7:
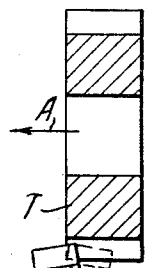
Figure 5:
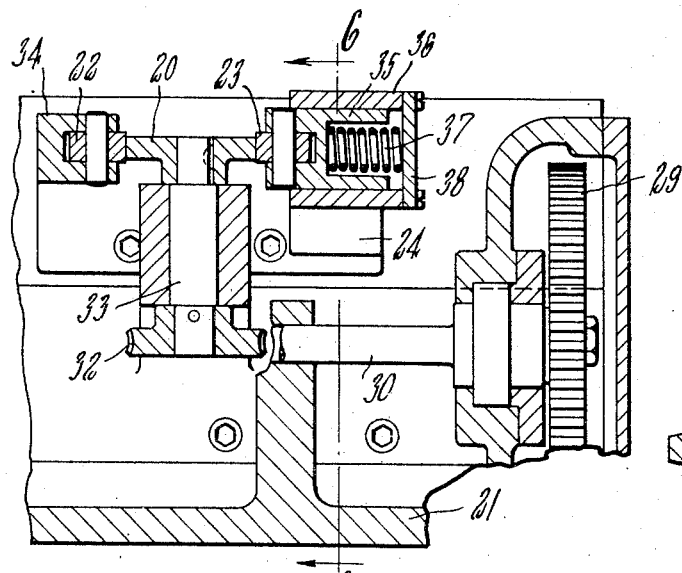
Fig. 5 is a vertical section taken on line 5—5 of Fig. 4.
Figure 8:
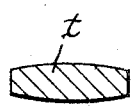
Figure 9:
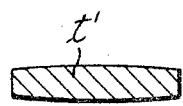

Fgi. 6 is a vertical section taken on line 6—6 of Fig. 5;

Fig. 7 is a diagrammatic sectional view of a finishing tool and gear illustrating the procedure of crowning the gear teeth;

Fig. 8 is a section of a crowned gear tooth taken on line 8—8 of Fig. 7 showing the crowning in exaggerated degree;

Fig. 9 is a similar section of a longer gear tooth crowned in less degree than the tooth shown in Fig. 8.

Like reference characters designate the same parts wherever they occur in all the figures.

In so far as the shaving machine here illustrated is like that shown in my before mentioned application Serial No. 266,854, only a brief description is needed. It is sufficient to say that the machine comprises a base 1, on which a work table 2 and a depth feed slide 3 are supported. A head stock 4 and a tail stock 5 are mounted on the table and carry centers 6 and 7, between which the gear to be finished is mounted rotatably.

The depth feed slide 3 supports a carriage 8 by means of rectilinear guideways extending substantially parallel to the axis of the centers 6 and 7 and on which the carriage is adapted to reciprocate. A turret 9 supports the finishing tool T rotatably and is adjustable angularly on the carriage, about an axis which intersects (preferably at right angles) the axis of the tool and the axis of the centers, in a manner such that the axis of the tool may be placed either parallel or at various inclinations to the axis of the centers 6 and 7. A shaft 10, supported in bearings in the turret 9, carries tool T and is rotatably driven by mechanism fully shown in my said prior application and, by reference, made a part of this description.

Carriage 8 is reciprocated by means of a lead screw 11 engaging a nut 12 secured to the carriage; the screw being rotated alternately in opposite directions by a reversible electric motor 13 through a pinion and face gear couple 14, a train of changeable gears 15, a shaft 16, to which the last gear of said train is secured, and a pinion and face gear couple 17, of which the face gear element is secured to the screw 11.

The work table 2 is coupled to the base by a pivot 18, of which the axis is transverse (preferably perpendicular) to the axis of centers 6 and 7, to the direction in which the carriage 8 is reciprocated, and to the axis around which the turret 9 is adjustable. In this machine the table is supported in a horizontal plane, the carriage travels in a horizontal path, the axis of centers 6 and 7 is horizontal, the meshing point of tool and work gear is in the same horizontal plane as that axis, and the turret is adjustable in a vertical plane; the axis of pivot 18 is vertical, and is located at one side of the tool in intersecting relation, or nearly so, with the axis of the centers. Normally the table is set with the axis of centers 6 and 7 parallel to the path of reciprocation of the tool. This is the situation when gears are finished without crowning. But by swinging the table about pivot 18, said axis may be inclined in either right or left convergence toward said path in various degrees.

In accordance with the present invention I have provided means for swinging the table progressively in the course of travel of the tool carriage 8 in each direction. Such means comprises an electric motor 19, a cam 20 and intermediate gearing, all mounted on a bracket 21 secured to one end of the base 1, and cam followers 22 and 23 mounted on a bracket 24 secured to the adjacent end of the table.

The motor 19, which may include reduction gearing in its casing, has a driving shaft 25 which is connected by a coupling 26 with a shaft 27 on which a gear 28 is secured detachably. Gear 28 meshes with a gear 29 secured to a worm shaft 30 on which is mounted a worm 31 meshing with a worm wheel 32 on the shaft 33 to which the cam 20 is secured. These several shafts are mounted in bearings suitably disposed on the bracket 21. Gears 28 and 29 are located for easy access to permit their removal and substitution of other gear pairs of different ratios. So also is cam 20 disposed for easy access and removal so that cams of different outlines may be substituted.

The cam followers 22 and 23 are preferably rolls, and they are located to engage the cam at diametrically opposite sides of the rotational axis thereof. Roll 22 is supported by a fixed lug 34 on bracket 24. The other roll is mounted on a slide or plunger 35 fitted to move endwise in the direction established by the line of centers of the two rolls in a guide 36 which is a structural part of bracket 24. A spring 37, confined between the slide 35 and an abutment 38, presses the slide 35 toward the cam, and is sufficiently powerful to transmit thrust of the cam in one direction to the slide without yielding. It takes up all backlash between the cam and the two followers, maintaining constant and substantially uniform pressure between them. It facilitates substitution of different cams by permitting the follower 23 to be retracted from the cam then in place and, when substitution has been made, by advancing the follower automatically into engagement with the substitute cam.

The cam driving motor 19 is reversed and driven in opposite directions in time with the carriage propelling motor 13. One manner in which this may be done is shown diagrammatically in Fig. 1. Here the leads to both motors are shown as connected to reversing switches 39 and 40, which may be of any one of a number of known types suitable for the purpose. These switches are alternately opened and closed to drive the motors reversely under control of the carriage drive. A worm 41 is coupled to one member of the gear train which rotates the lead screw 11, conveniently by being keyed to an extension shaft from the lead screw. It meshes with a worm wheel 42 on a shaft 43 which, through a pinion 44 and face gear 45, turns a timing drum or disk 46. Two dogs 47 and 48 are secured to disk 46 with a space between them and are adjustable to vary the width of such space. A lug 49 carried by a reciprocable switch shifter 50 projects into the space between dogs 47 and 48 and is operatively coupled with the reversing switches in known manner to operate them reversely when moved oppositely by the respective dogs.

The cam drive here disclosed has greater capacity for producing a wide variety of different crowning effects in gear teeth than any other means for the purpose with which I am acquainted. Not only may cams of different contours be substituted for one another, but a large number of different effects may be obtained with the use of the same cam. Where two followers are used, located at opposite sides of the cam, as here shown, the cam may be rotated through 180° in each direction or any fraction of that angle, by substitution of different pairs of change gears 28 and 29. The progressive rotation of the cam continues through the entire stroke of the carriage, wherefore by rotating the cam at a faster or slower rate, by selection of appropriate gears, all or a part only of the difference between the longest and shortest radii of the cam may be utilized in crowning a gear. In this way, different gears of the same length may be given a greater or less degree of crowning. Again, by increasing or shortening the length of carriage stroke, and selecting appropriate gears for the cam drive, a large number of gears of different lengths (in other words, different face widths) may be crowned in like or different degrees by the same cam. Still other effects may be obtained by adjusting the cam about its axis, with or without compensating displacement of the head and foot stocks, whereby the maximum width of the crowned teeth may be located either midway between the ends or at either side of the mid length in varying measure.

Two of the many possible effects are illustrated in Figs. 8 and 9, with reference to Fig. 7. The latter figure shows in an exaggerated way the character of the tilting movement of the work gear. Assuming that the tool T has started to travel in the direction of the arrow A, the work gear W is at an inclination such that its axis $a$—$b$ diverges from the course of the tool. As the action proceeds, the gear swings about the pivot 18 until it attains the opposite inclination, indicated by its dotted line position, when the tool arrives at the end of its stroke. Any tooth $t$ then has bounding outlines, on the plane of section 8—8, of the character shown in Fig. 8. Now if a gear of greater length is swung through a less angle than that indicated by Fig. 7, while a tool of appropriate length is caused to travel through a distance appropriate to the length of the gear, the teeth $t'$ of such gear are given a flatter crowning curvature, somewhat as shown in Fig. 9. When lapping or burnishing tools are used, generally similar results to those obtained by the use of shaving tools are obtained, within the limitations inherent in the use of such tools.

The principles of means for performing the actions described in the foregoing specification may be embodied in other forms of machine in which the essential cooperating parts are combined in other ways than those shown, all of which are within the scope of the protection herein sought.

What I claim and desire to secure by Letters Patent is:

1. A machine for finishing gears with crowned teeth, which comprises a structure for supporting a work gear rotatably, a carriage constrained to move in a path at one side of and parallel to the axis of rotation of such gear, said carriage having means for mounting a finishing tool rotatably in position to mesh with a gear mounted on said supporting structure, a reversibly rotatable cam engaged with said supporting structure and operable to shift said structure so as to incline the axis of the work gear to the path of said carriage in the plane established by said axis and the meshing point of the tool with the work gear, and correlated means for moving said carriage back and forth in its prescribed path and reversing the rotation of said cam in timed relation with the reversals of the carriage.

2. A machine for finishing gears with crowned teeth, which comprises a structure for supporting a work gear rotatably, a carriage constrained to move in a path at one side of and parallel to the axis of rotation of such gear, said carriage having means for mounting a finishing tool rotatably in position to mesh with a gear mounted on said supporting structure, a movable cam engaged with said supporting structure in a manner to cause shifting thereof when the cam is moved so as to incline the axis of the work gear, carriage-moving means for moving the carriage back and forth, and separate cam-moving means for moving the cam back and forth in timed relation with the movements of the carriage, one of the said moving means having provisions whereby the ratio between the movement of the cam and that of the carriage may be varied.

3. A machine for finishing and crowning the teeth of gears, comprising a structure constructed to support a work gear rotatably, a tool having the form of a gear conjugate to the work gear, means for supporting said tool in mesh with the work gear, means for effecting relative reciprocating movement between the tool holding means and the work supporting structure in directions substantially parallel to the axis of rotation of the work gear, said work supporting structure being inclinable about an axis substantially perpendicular to the plane established by the axis of the gear and the pitch point of the tool and gear, a cam engaged with the work supporting structure and formed to alter the inclination of said structure progressively with continued movement of the cam, and means for varying the extent of movement of the cam relatively to the length of the relative traversing movement between the work gear and tool.

4. In a gear finishing machine, the combination of a recirocable carriage, a gear-like finishing tool supported rotatably on the carriage, a work table having means for supporting rotatably a gear blank with its axis parallel to the path of the carriage, said table being supported with provision for angular movement whereby to incline the work gear axis to opposite inclinations with respect to said path, a rotatable cam engaged with said table and arranged to effect such inclinations of the table when rotated, and means for rotating said cam reversibly in timed relation with the opposite reciprocations of the carriage, said cam rotating means including provisions for altering the extent of rotation of the cam in the course of a reciprocating movement of the carriage.

5. In a gear finishing machine, a work supporting means having provisions for mounting a work gear rotatably, a tool supporting means, a gear-like finishing tool mounted rotatably on said tool supporting means, means for effecting reciprocating movements between the tool supporting and work supporting means in the direction of the axis on which the work gear rotates, said work supporting means being angularly movable about an axis transverse to the work gear axis and to the direction of said reciprocating movements, whereby to incline the work gear axis in various degrees and at opposite inclinations with respect to said reciprocating movements, a reversibly rotatable cam for so inclining the work supporting structure, cam followers carried by the last named structure embracing the cam and engaging the same at opposite sides of the axis thereof, and means for reversing and rotating the cam in time with said reciprocating movements.

6. In a gear finishing machine, a work supporting means having provisions for mounting a work gear rotatably, a tool supporting means, a gear-like finishing tool mounted rotatably on said tool supporting means, means for effecting reciprocating movements between the tool supporting and work supporting means in the direction of the axis on which the work gear rotates, said work supporting means being angularly movable about an axis transverse to the work gear axis and to the direction of said reciprocating movements, whereby to incline the work gear axis in various degrees and at opposite inclinations with respect to said reciprocating movements, a reversibly rotatable cam for so inclining the work supporting structure, cam followers carried by the last named structure embracing the cam and engaging the same at opposite sides of the axis thereof, and means for reversing and rotating the cam in time with said reciprocating movements, said cam driving means including provisions for altering the extent of angular movement imparted to the cam between the reversals thereof.

7. In a gear finishing machine as set forth in claim 5, means for mounting one of the cam followers with provisions for yieldingly resisted movement away from the axis of the cam.

8. In a gear finishing machine, a base, a work table having means for supporting a work gear rotatably and being pivotally connected with the base to swing about an axis transverse to the work gear axis, separated cam followers projecting from the table, a rotary cam between said cam followers in engagement with both, said cam and cam followers being arranged to transmit movement to the table angularly about said pivot, and reversible driving means associated with said cam for driving the same in opposite directions.

9. In a gear finishing machine, a base, a work table having means for supporting a work gear rotatably and being pivotally connected with the base to swing about an axis transverse to the work gear axis, separated cam followers projecting from the table, a rotary cam between said cam followers in engagement with both, said cam and cam followers being arranged to transmit movement to the table angularly about said pivot, and reversible driving means associated with said cam for driving the same in opposite directions, said driving means including provisions for altering the distance traversed by the cam between reversals thereof.

10. In a gear finishing machine, a base, a work supporting table in pivotal connection with the base having means for supporting a work gear rotatably with the axis of rotation thereof transverse to the axis of said pivotal connection, separated cam followers carried by the table, and a rotatable cam between said followers, one of the followers being mounted with provisions for movement toward and away from the cam and being resiliently held against the cam.

11. In a machine the combination of a table supported for movement in opposite directions, separated lugs projecting from said table and spaced apart in a line conforming generally with the path of that portion of the table whereat said lugs are located, a cam mounted rotatably in the space between said lugs, a slide mounted in one of said lugs and guided to move in a line intersecting the axis of the cam and having a follower portion engaging the circumference of the cam, a spring reacting between said slide and lug forcing the slide toward the cam, and a follower element on the other lug engaging the cam at a location at the opposite side of the cam axis from the engagement with the first follower element.

EDWARD W. MILLER.